June 22, 1948.  G. HERZOG ET AL  2,443,731
METHOD AND APPARATUS FOR LOGGING BORE HOLES
Filed Nov. 27, 1943
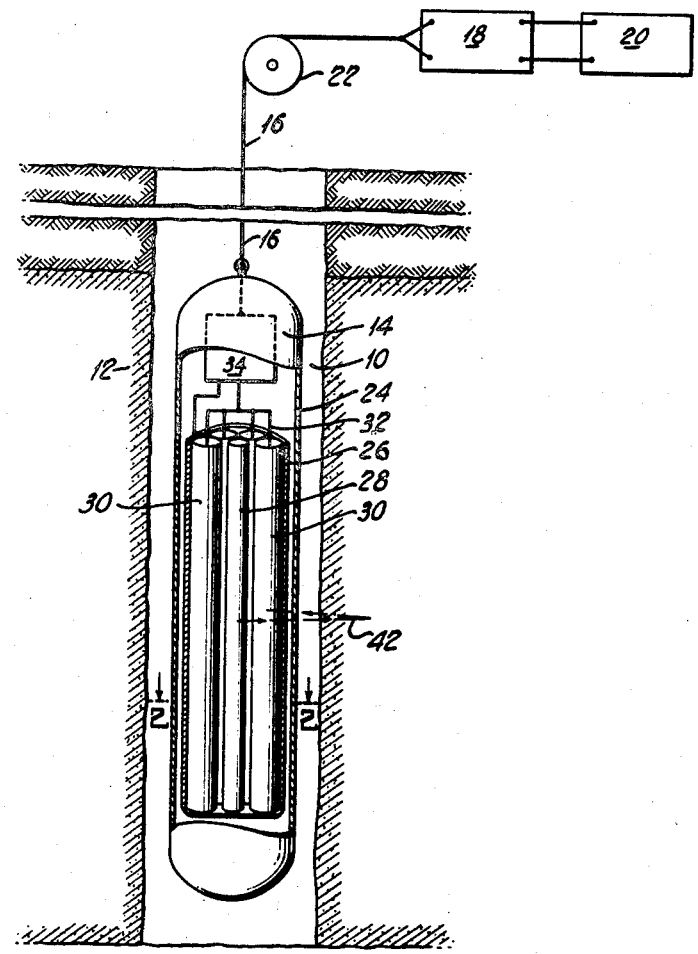
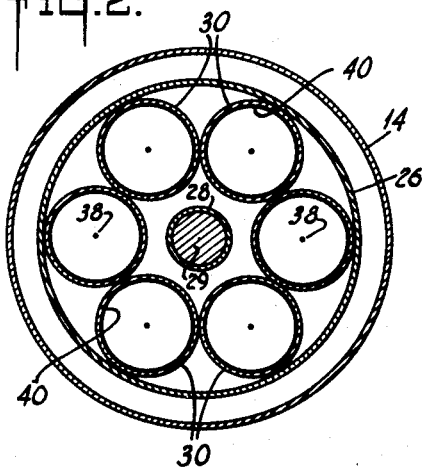
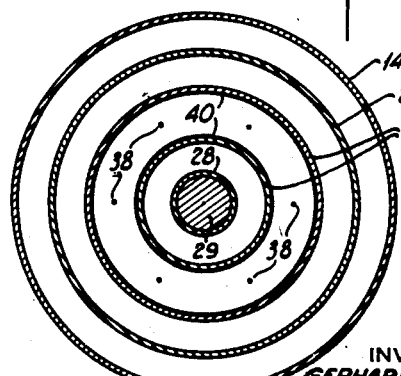
INVENTOR
GERHARD HERZOG, AND
KENNETH CARL CRUMRINE
BY
ATTORNEY Patented June 22, 1948

2,443,731

UNITED STATES PATENT OFFICE 2,443,731

METHOD AND APPARATUS FOR LOGGING BOREHOLES

Gerhard Herzog, Houston, and Kenneth Carl Crumrine, Bellaire, Tex., assignors to The Texas Company, New York, N. Y., a corporation of Delaware Application November 27, 1943, Serial No. 511,990

16 Claims. (Cl. 250—83.6)

This invention relates to bore hole or well logging and more particularly to a method and an apparatus for determining the nature and location of underground formations traversed by a bore hole by subjecting these formations to penetrative radiation and measuring the amount of the radiation which is scattered in the formations and returned to the bore hole. The principal object of the invention is to provide a method and an apparatus by means of which a "radioactive" log of a bore hole can be made, the log being of a higher quality than formerly obtainable with an equivalent amount of radiation source material.

During the past year or so bore holes have been logged by passing a source of neutron radiation through the hole together with a detector responsive to radiation. The neutrons which penetrate the formation interact with the nuclei in the rock and two processes occur. In one case the neutrons are captured by nuclei in the formation and gamma rays are emitted either simultaneously or later. In a second case the neutrons are scattered by the nuclei whereby both their direction and their energy is changed. In some cases, together with the scattering of neutrons, gamma rays are emitted. The intensity of either the gamma rays or the scattered neutrons can be taken as a measurement of the physical properties of the formations. One can therefore obtain a log of the formations by either measuring the intensity of the gamma rays or of the scattered neutrons. During the past year or so logs have been taken in which it was attempted to measure the intensity of these gamma rays. In carrying out this method a source of neutron radiation such as a mixture of radium and beryllium has been mounted in a housing and a detector of gamma rays has been disposed within the housing, usually above the neutron source and separated from the source by a fairly heavy shield in order to minimize the effect of neutrons and gamma rays which pass directly from the source to the detector. This method has the following disadvantages: The neutron source generally used, which consists of a mixture of radium and beryllium, emits together with the neutrons a large intensity of gamma rays. These gamma rays penetrate into the formation and are scattered, whereby some of the primary gamma rays enter the detector. In addition to these gamma rays other gamma rays are impinging on the detector, these being due to natural radioactive material in the formation. It is the object of the neutron log to measure only those gamma rays which are due to the action of the neutrons. This can only be done if the gamma ray intensity due to this process is appreciable compared to the gamma ray intensity which is caused both by scattering of the primary gamma rays and those present in the formation. In attempting to obtain a favorable ratio it is customary to separate the neutron source by a large distance from the detector, whereby the scattering effect is decreased, but unfortunately the intensity at the detector of the gamma rays due to the neutron effect is also decreased.

The effect of scattered gamma rays can obviously be avoided if a neutron source is used which emits only neutrons and not gamma rays, for example a mixture of polonium and beryllium. Such a source is not only expensive but it is almost unobtainable. Even with the use of such a source one would still have to get enough contrast between the gamma rays which are due to the natural radioactivity of the ground, and the gamma rays which are created from the neutron interaction. In order to make this ratio favorable, one has to use a very large neutron source.

All these factors can be avoided if a neutron log of a different type is used. In this case again a neutron source is lowered into the hole together with a detector, but the detector is such that it measures the number of the scattered neutrons to the substantial exclusion of gamma radiation. In dealing with neutrons one has to discriminate between "fast" and "slow" neutrons. Slow neutrons are neutrons of small velocity and their energy is of the order of the thermal energy. Fast neutrons are of much higher energy. A radium-beryllium mixture emits a greater part of the neutrons as fast neutrons. Using a neutron detector sensitive only to slow neutrons, the neutron source can be placed very close to the detector. Such an arrangement is much more efficient and permits the use of smaller quantities of radium than any other arrangement where the source is placed at a large distance from the detector.

As devices for detecting radiation, ionization chambers, proportional counters or Geiger-Müller counters can be used.

The actions of an ionization chamber, a proportional counter, and a Geiger-Müller counter differ as follows: In all three cases ions are set free in the gas through the action of the rays. This ionizing may be a direct ionization of the gas, or it may be a secondary ionization of the gas due to the action of charged particles which are emitted from the walls of the container. In all three devices the ions are collected at the electrode, but in the Geiger-Müller counter and in the proportional counter a multiplication of the ions occurs within the detector. Due to this multiplication, the charge which is collected is much larger in the cases of the Geiger-Müller counter and of the proportional counter than in the ionization chamber. The charge collected can or cannot be dependent on the number of primary ions which are formed in the gas by one individual ray. In a Geiger-Müller counter this multiplication results in a charge the size of which is independent of the number of ions formed by one ray; in a proportional counter, however, the charge is proportional to the number of ions formed. The result is, therefore, that the size of the charge pulses in a proportional counter varies with the effectiveness of the ionizing rays. The number of these pulses is a measure of the number of such rays, i. e., of the intensity of the rays. It is therefore possible with a proportional counter to distinguish between rays which produce different amounts of primary ionization.

Neutrons do not ionize at all. In order to detect neutrons one has to use an intermediate reaction by which the neutrons release an ionizing particle which in turn acts on the gas of the proportional counter. Such reactions are known to occur with, for example, lithium and boron. A proportional counter can either be filled with a gas, such as boron trifluoride which contains a compound of one of these elements, or the wall of the counter can be lined with the elements or their compounds or both the reactive wall coating and the reactive gas can be used. In these reactions alpha particles are emitted under the action of the neutrons, whereas gamma rays release electrons. The specific ionization of alpha rays is much greater than that of electrons; therefore, the charge pulses in the proportional counter are larger if they are due to neutrons than if due to gamma rays. By selecting the pulse size with suitable electrical circuits one can therefore distinguish between the neutrons and the gamma rays.

In accordance with this invention a source of neutrons, preferably a mixture of radium and beryllium, together with a detector, is mounted in a housing which is to be passed through the bore hole. The neutron source preferably is located along the axis of the detector and is as close as possible to the center of the detector. The fast neutrons emitted by the source pass more or less radially outwardly through the detector into the formations traversed by the hole, and in these formations the neutrons are scattered and slowed down, some of them returning to the detector substantially along the same path or in the plane in which they were emitted. It will thus be seen that a minimum path for the neutrons is provided and because of this a relatively weak neutron source will afford a log of high quality. As is explained above, were the neutron source displaced longitudinally from the detector, as is usually the case, the neutrons would have to travel much farther before those which are scattered and slowed down are returned to the detector and consequently a much larger source of neutrons would have to be used.

The invention also contemplates the use of a proportional counter or counters as the instrument for detecting the returned, slow neutrons and, since, as has been explained, such a device is sensitive primarily to slow neutrons and relatively insensitive to fast neutrons and gamma rays, a highly effective detector is thereby provided.

For a better understanding of the invention, reference may be had to the accompanying drawing in which:

Figure 1 is a vertical elevation through a portion of a bore hole in which a logging device is shown somewhat diagrammatically;

Figure 2 is a section taken on the lines 2—2 of Figure 1; and

Figure 3 is a view somewhat similar to Figure 2 but in which an annular form of detector is used.

With reference to Figure 1, a bore hole or well 10 is shown as penetrating several underground formations one of which is illustrated at 12. A logging instrument represented generally at 14 in the form of an elongated housing or capsule is adapted to be lowered and raised through the hole 10 by means of a cable 16. The cable 16 contains one or more electrical conductors which serve to connect the detector with an amplifier 18 which may be connected in turn to a suitable recorder or indicating device 20. The cable may also conduct to the instrument the current necessary to energize the detector. The cable 16 is shown as passing over a drum 22 which serves to measure the length of the cable and thus the depth of the instrument in the hole, as is well known in this art.

Mounted within the housing or shell 24 of the instrument 14 is a second shell 26 which houses a source of neutrons and a neutron detector or detectors. Mounted substantially on the axis of the housing 26 is a pipe or tube 28 which contains the neutron source 29 such as a mixture of radium and beryllium. Disposed around the source 28 and parallel to the pipe containing the source is the neutron detector or rather a multi-element detector 30. Each of the elements 30 comprises essentially a cylindrical cathode and a wire anode 32 stretched along the longitudinal axis of the cathode. The detector shell 26 is filled with a gas such as methane under a pressure of about two inches of mercury. The anode wires 32 are shown as connected together electrically and then to a suitable preamplifier 34 while the cathodes are also connected to the preamplifier through the shell 26. It is to be understood that the ends of the detectors are open, the shell 26 being suitably sealed by means of a cover, not shown, at its upper end so as to contain the desired gas.

Although a multi-element detector or counter is shown in Figures 1 and 2 of the drawing, a single or unitary detector can also be used and such a detector is shown in Figure 3. In this form the cathode of the detector comprises a pair of concentric cylindrical members 36 separated radially and the anode comprises a plurality of wires 38 stretched between and parallel to the cathode cylinders. In this form the upper and lower ends of the detector are sealed, the anode wires 38 extending outwardly through suitable insulation, not shown. The space between the cathodes 36 would, of course, be filled with a suitable gas such as methane.

In a proportional counter for detecting slow neutrons it is essential that the walls of the cathode be prepared by placing on the walls a coating 40 of a compound of boron, such as boron carbide, or, in the absence of the prepared walls, that a suitable gas such as boron trifluoride be maintained within the detector. It is understood that in the forms of the invention disclosed in Figures 1, 2 and 3 one or the other of these practices is followed, or both simultaneously; i. e., that the interior surfaces of the cathodes 30 and 36 be coated with a neutron-reactive material such as boron carbide or that the detectors be filled with a gas such as boron trifluoride.

In operation, the instrument 14 is passed through the hole 10 in the formations 12 by means of the cable 16 and the depth of the instrument is noted simultaneously with the indication of the meter or recorder 20. Fast neutrons coming from the neutron source pass freely through the boron carbide coating. In the formation, they are slowed down and some are reflected or scattered back to the detector. Due to their lower energy these neutrons can be measured with the detector through their reaction with the boron coating and the resulting ionization of the gas in the counter. The pulses thus produced in the detector pass to the preamplifier 34 from which they are conducted through the cable 16 to the amplifier 18 at the surface and then to the indicator or recorder 20. Since the detector elements 30 surround the neutron source, the length of the path of a neutron, such as is shown by the dotted line 42, into the formation and back to a detector element is less than would be the case where the neutron source is displaced longitudinally from the detector. Thus, it is possible to obtain the same results with a relatively small amount of radium, together with greater penetration or greater penetration with the same amount of radium. Since the detectors 30 are constructed as proportional counters, these detectors are primarily sensitive to the returned, slow neutrons and are quite insensitive to gamma rays also emitted from the radium.

If it is desired only to determine the neutron scattering effect over a short length of the bore hole, the instrument can be lowered with great speed into this region and a record taken only over the limited range of hole.

Although the neutron source has been described and illustrated as surrounded or embraced by the detector, it is also contemplated that a single detector can be disposed along and at one side of the radiation source. Again, it may, in some instances, be desirable to use a single detector or counter and a plurality of sources. In this case the sources could surround or be placed at one or more sides of the detector. While the radiation detector has been referred to and shown in Figures 1 and 2 as a multi-element counter, and in Figure 3 as a single counter having a plurality of anodes, it is also contemplated that each of the units 30 can constitute a separate detector or counter having its own cathode, anode and gas filling.

Obviously many other modifications and variations of the invention, as hereinbefore set forth, may be made without departing from the spirit and scope thereof, but only such limitations should be imposed as are indicated in the appended claims.

We claim:

1. The method of determining the nature of underground formations traversed by a bore hole which comprises placing a source of penetrative radiation in the hole at a known depth so that radiation emitted from said source will penetrate the formations in a plane substantially at right angles to the longitudinal axis of the hole, and measuring the amount of said radiation which is scattered and slowed down in the formations and returned toward the source in substantially said same plane, the nature of the radiation emitted from said source being such that it is not measurable when passing outwardly into the formations but is measurable after being scattered and slowed down in the formations.

2. The method of determining the nature of underground formations traversed by a bore hole which comprises placing a source of neutron radiation in the hole at a known depth so that neutrons will penetrate the formations in a substantially horizontal plane, and measuring the amount of neutrons scattered and slowed down in the formations and returned toward the source in substantially said same plane.

3. The method of determining the nature and location of earth formations traversed by a bore hole which comprises passing a vertically elongated source of neutron radiation through said hole so that neutrons will penetrate the formations surrounding the hole in substantially horizontal directions, said neutrons being scattered and slowed down in the formations and returned toward the source also in substantially horizontal directions, and measuring the amount of said returned neutrons by detecting means horizontally surrounding said source.

4. The method of determining the nature and location of earth formations traversed by a bore hole which comprises passing a vertically elongated source of neutron radiation longitudinally through said hole so that neutrons will penetrate the formations surrounding the hole in substantially horizontal planes, said neutrons being scattered and slowed down in the formations and returned toward the source substantially in said same planes, and measuring the amount of said returned neutrons by detecting means also disposed in said same horizontal planes.

5. In the method of logging a bore hole wherein neutron radiation from a source in the hole passes into the surrounding formations and is scattered therein so that some of the neutrons return to a slow neutron detector in the hole, the step of minimizing the length of the paths of the neutrons which comprises placing the source within the detector so that the fast neutrons will pass through the detector and outwardly into the formations, the scattered and slowed neutrons returning to the detector over substantially the same path.

6. In the method of logging a bore hole wherein neutron radiation from a source in the hole passes into the surrounding formations and is scattered therein so that some of the neutrons return to a slow neutron detector in the hole, the step of minimizing the length of the paths of the neutrons which comprises placing the source along the longitudinal axis of a vertically elongated, slow neutron detector so that the fast neutrons will pass through the detector and outwardly into the formations, the paths of the fast neutrons into the formations and of the slowed neutrons back to the detector being substantially horizontal.

7. The method of determining the nature and location of earth formations traversed by a bore hole which comprises passing a source of neutron radiation through said hole so that neutrons will penetrate the formations surrounding the hole in a substantially horizontal plane, said neutrons being scattered and slowed down in the formations and returned toward said source in said same horizontal plane, and measuring the amount of said returned neutrons by detecting means sensitive to slow neutron radiation and substantially non-sensitive to gamma radiation and fast neutrons.

8. A device for determining the nature and location of underground formations traversed by a bore hole, comprising a housing, means for lowering and raising said housing through said hole, a source of penetrative radiation in said housing, a radiation detector in said housing embracing said source, said detector being ineffective to measure the radiation passing outwardly from said source and effective to measure radiation from the source which is scattered and slowed down in said traversed formations and returned to the hole, and means for measuring the depth of the housing in the hole.

9. A radioactive device for logging the formations surrounding a bore-hole comprising an elongated housing adapted to be passed through said hole, a source of penetrative radiation in said housing, and a plurality of elongated radiation detectors in said housing disposed around the sides of said source, said detectors being ineffective to measure the direct radiation emitted from said source and effective to measure radiation from the source after it has been scattered and slowed down in said surrounding formations.

10. An instrument adapted to be passed through a bore hole for determining the nature and location of the formations traversed by said hole comprising a housing, a source of neutrons in said housing, and a proportional counter also disposed in said housing encompassing said source the arrangement being such that fast neutrons from said source will penetrate the formations where some of the neutrons will be slowed down and scattered so as to return to the hole to actuate said counter.

11. An instrument adapted to be passed through a bore hole for determining the nature and location of the formations traversed by said hole comprising a housing, a source of neutrons in said housing, means for detecting slow neutrons scattered in the formations and returned to the hole, said means comprising a proportional counter disposed laterally around said source, an indicating device at the surface, means for conducting the pulses of said counter to said indicating device, and means for measuring the depth of the instrument in the hole.

12. A device adapted to be passed through a bore hole for determining the nature and location of the formations traversed by said hole comprising a vertically elongated source of neutrons, and a vertically elongated proportional counter disposed substantially parallel to and surrounding said source of neutrons.

13. A device for determining the nature and location of underground formations traversed by a bore hole, comprising a housing, means for lowering and raising said housing through said hole, a source of neutrons in said housing, a proportional counter for detecting slow neutrons in said housing embracing said source and means for measuring the depth of the housing in the hole.

14. A radioactive, bore-hole logging device comprising an elongated housing adapted to be passed through said hole, a source of neutrons in said housing, and a neutron detector in said housing, said detector comprising a pair of metallic concentric cylindrical cathode members separated to form an annular space therebetween and a plurality of wire anode members disposed in said space parallel to said cathode members and to each other, the source of radiation being disposed on the longitudinal axis of said cathode members.

15. A radioactive bore hole logging device comprising an elongated housing adapted to be passed through said hole, a vertically elongated source of neutrons in said housing, and a plurality of tubular neutron detectors, each of said detectors being of substantially the same length as said source and disposed in parallel to and at the side of said source, the arrangement being such that radiation emitted from said source will pass substantially horizontally outward from said source through said detectors into the formations around the hole, some of the neutrons scattered and slowed down in the formations returning substantially horizontally to said detectors.

16. A radioactive bore hole logging device comprising an elongated housing adapted to be passed through said hole, a vertically elongated source of neutrons in said housing, and a plurality of proportional counters for detecting slow neutrons, each of said counters being substantially coextensive with said source and disposed in parallel to and at the side of said source, the arrangement being such that fast neutrons emitted from said source will pass substantially horizontally outward from said source through said counters into the formations around the hole, some of the neutrons scattered and slowed down in the formations returning substantially horizontally to said counters.

GERHARD HERZOG.
KENNETH CARL CRUMRINE.

REFERENCES CITED

The following references are of record in the file of this patent:

UNITED STATES PATENTS

| Number | Name | Date |
|---|---|---|
| 2,220,509 | Brons | Nov. 5, 1940 |
| 2,288,718 | Kallmann | July 7, 1942 |
| 2,316,361 | Piety | Apr. 13, 1943 |
| 2,345,119 | Hare | Mar. 28, 1944 |
| 2,349,712 | Fearon | May 23, 1944 |
| 2,351,028 | Fearon | June 13, 1944 |
| 2,374,197 | Hare | Apr. 24, 1945 |